US011095428B2

(12) United States Patent
Vaikuntanathan et al.

(10) Patent No.: US 11,095,428 B2
(45) Date of Patent: Aug. 17, 2021

(54) HYBRID SYSTEM AND METHOD FOR SECURE COLLABORATION USING HOMOMORPHIC ENCRYPTION AND TRUSTED HARDWARE

(71) Applicant: Duality Technologies, Inc., Maplewood, NJ (US)

(72) Inventors: Vinod Vaikuntanathan, Boston, MA (US); Arina Shainski, Ramat Hasharon (IL)

(73) Assignee: DUALITY TECHNOLOGIES, INC., Maplewood, NJ (US)

( * ) Notice: Subject to any disclaimer, the term of this patent is extended or adjusted under 35 U.S.C. 154(b) by 221 days.

(21) Appl. No.: 16/520,618

(22) Filed: Jul. 24, 2019

(65) Prior Publication Data

US 2020/0036512 A1   Jan. 30, 2020

Related U.S. Application Data

(60) Provisional application No. 62/702,669, filed on Jul. 24, 2018.

(51) Int. Cl.
*H04L 9/00* (2006.01)
*H04L 29/06* (2006.01)
*G06F 21/60* (2013.01)

(52) U.S. Cl.
CPC .......... *H04L 9/008* (2013.01); *G06F 21/602* (2013.01); *H04L 63/0442* (2013.01); *H04L 63/08* (2013.01); *H04L 2209/122* (2013.01); *H04L 2209/46* (2013.01)

(58) Field of Classification Search
CPC ..... H04L 9/008; H04L 63/08; H04L 63/0442; H04L 2209/122; H04L 2209/46; G06F 21/602; G06F 21/07
See application file for complete search history.

(56) References Cited

U.S. PATENT DOCUMENTS 10,289,816 B1 *  5/2019  Malassenet ......... G06F 9/30036
10,885,158 B2   1/2021  Goldwasser et al.
(Continued)

OTHER PUBLICATIONS

Chen et al., "Implementing Token-Based Obfuscation under (Ring) LWE." In: IACR Cryptol. May 15, 2019.
(Continued)

*Primary Examiner* — Meng Li
(74) *Attorney, Agent, or Firm* — Pearl Cohen Zedek Latzer Baratz LLP

(57) ABSTRACT

A device, system and method for secure collaborations on encrypted data in a hybrid environment of a homomorphic encryption (HE) enabled device and trusted hardware. A set of computations may be divided into a subset of linear computations and a subset of non-linear computations. The linear computations on the encrypted data may be executed using homomorphic encryption (HE) in the homomorphic encryption (HE) enabled device. The non-linear computations on the unencrypted data may be executed in the trusted hardware in an unencrypted domain and encrypting the result. The results of the linear and non-linear computations may be decrypted and merged to generate a result equivalent to executing the set of linear and non-linear computations on the unencrypted data.

20 Claims, 4 Drawing Sheets

(56) References Cited

U.S. PATENT DOCUMENTS

| | | | | |
|---|---|---|---|---|
| 2003/0081769 A1* | 5/2003 | Hamilton | ............ | H04N 1/32208 |
| | | | | 380/28 |
| 2010/0329448 A1* | 12/2010 | Rane | ....................... | H04L 9/008 |
| | | | | 380/28 |
| 2011/0243319 A1* | 10/2011 | Shirai | ................... | H04L 9/0631 |
| | | | | 380/28 |
| 2018/0096248 A1* | 4/2018 | Chabanne | ............... | G06F 17/18 |
| 2019/0372762 A1 | 12/2019 | Shainski et al. | | |

OTHER PUBLICATIONS

Juvekar et al., "GAZELLE: A Low Latency Framework for Secure Neural Network Inference." In: ArXiv. Jan. 16, 2018, retrieved from <https://arxiv.org/abs/1801.05507>.

* cited by examiner

HYBRID SYSTEM AND METHOD FOR SECURE COLLABORATION USING HOMOMORPHIC ENCRYPTION AND TRUSTED HARDWARE

CROSS-REFERENCE TO RELATED APPLICATIONS

This application claims the benefit of U.S. Provisional Patent Application Ser. No. 62/702,669, filed Jul. 24, 2018, which is hereby incorporated by reference in its entirety.

FIELD OF THE INVENTION

Embodiments of the invention are directed to data privacy, security, and encryption of secret data. In particular, embodiments of the invention are directed to secure multi-party collaborations, in which one or more parties encrypt their secret data to safely share with one or more external or third parties, which can then remotely operate on the data, without exposing the underlining secret data to an untrusted party.

BACKGROUND OF THE INVENTION

Today, massive amounts of data live in many organizations, with barriers between them, erected by mistrust, economic incentives and regulatory hurdles. When secret data, such as, personal or medical data is involved, privacy becomes a major concern for all parties involved, as that information can be used to identify or exploit the individuals.

Standard encryption garbles data. Because encryption obscures and permutes the content and order of the data, computations conventionally are not performed on the encrypted data. To perform operations, the encrypted data is decrypted at a special designated "trusted hardware" device, where the operations are performed in the unencrypted domain, and the result is re-encrypted. Trusted hardware is special dedicated hardware, distinct from main memory, that meets security protocol(s), designated to keep it safe from tampering. Trusted hardware is often implemented as a "secure chip" and generally has limited memory and computational capacity, rendering it slow and having insufficient storage when large amounts of data and complex computations are involved.

To obviate the need for special trusted hardware, while still protecting data secrecy, Homomorphic Encryption (HE) cryptosystems have been developed that allow untrusted parties to perform computations on encrypted data (i.e., ciphertexts) in an encrypted domain. Homomorphic Encryption (HE) cryptosystems allow a third party to evaluate computations on encrypted data without learning anything about the data, such that only the legitimate recipient of the homomorphic calculation will be able to decrypt the data using the recipient's secret key.

Although HE can theoretically work on any data, HE is extremely slow because the source data is encrypted in a representation significantly larger than the source data, so many more operations need to be performed to support computations on encrypted data than the source data. In practice, HE is unrealistic to use in most real-world settings, especially when large amounts of data and complex computations are involved.

Accordingly, there is a need in the art for a fast and efficient technique to perform collaborative operations on secret data without exposing the underlining secret data to an untrusted party.

SUMMARY OF EMBODIMENTS OF THE INVENTION

To overcome the aforementioned limitations inherent in the art, embodiments of the invention may provide a fast and efficient technique for secure collaborations on encrypted data. Embodiments of the invention may provide a hybrid environment combining a homomorphic encryption (HE) enabled device performing HE computations in an encrypted domain (e.g., not in trusted hardware) and a trusted hardware device performing computations in an unencrypted domain (e.g., in trusted hardware). An original set of computations may be split into a subset of linear computations and a subset of non-linear computations. Because linear computations are typically performed relatively fast and efficiently using HE, the HE-enabled device may perform only the subset of linear computations. However, because non-linear computations are performed relatively slowly using HE, the subset of non-linear computations may not be performed using HE, but may instead only be performed in the unencrypted domain at the trusted hardware, and then re-encrypted. After the linear and non-linear computations are performed in their separate devices, the encrypted results of both may be decrypted and merged, to generate results equivalent to performing the original combined (undivided) linear and non-linear computations on the data. The results may either be merged in the encrypted domain by HE at the HE enabled device and sent to a recipient device to be decrypted, or sent to a recipient device to be decrypted and then merged in the unencrypted domain.

Such a divide-and-conquer approach splits linear and non-linear computations into different respective encrypted and unencrypted domains to optimize speed and security according to each type of data: Linear computations are performed relatively fast using HE, so shifting linear computations to HE devices reduces the memory and computational burden of executing them at limited-capacity trusted hardware. Meanwhile, non-linear computations are relatively slow using HE, so performing them in the unencrypted domain at the trusted hardware increases speed compared to executing those computations under HE. In some embodiments, such benefits are maximized where non-linear computations are significantly fewer or a minority proportion (e.g., less than 10%), and linear computations are significantly greater or a majority proportion (e.g., more than 90%), of the total computations. The overall benefits of embodiments of the invention may increase the speed or runtime of the processor(s) executing the computations approximately linearly proportionally to the number of multiplications performed.

A device, system and method is provided for secure collaborations on encrypted data in a hybrid environment of a homomorphic encryption (HE) enabled device and trusted hardware. A set of computations may be divided into a subset of linear computations and a subset of non-linear computations. The linear computations on the encrypted data may be executed using homomorphic encryption (HE) in the homomorphic encryption (HE) enabled device. The non-linear computations on the unencrypted data may be executed in the trusted hardware in an unencrypted domain and encrypting the result. The results of the linear and non-linear computations may be decrypted and merged to generate a result equivalent to executing the set of linear and non-linear computations on the unencrypted data.

In some embodiments, a client may transmit to a server, data encrypted with the client's public key and the client's secret key encrypted with a trusted device's public key. The server may perform said dividing the set of computations into the subset of linear computations and the subset of non-linear computations, transmit to the homomorphic encryption (HE) enabled device the subset of linear computations and the encrypted data, and transmit to the trusted hardware the subset of non-linear computations, the encrypted data, and the encrypted secret key. The homomorphic encryption (HE) enabled device may execute the linear computations on the encrypted data without decrypting the data to generate a homomorphically encrypted result of the linear computations, and transmit the homomorphically encrypted result of the linear computations, directly or indirectly (e.g., via the server), to a recipient device. The trusted hardware may decrypt the client device's secret key and use it to consequently decrypt the data for said executing the non-linear computations on the unencrypted data and encrypting the result, and transmit the encrypted result of executing the non-linear computations, directly or indirectly (e.g., via the server), to a recipient device. The HE enabled device may execute the linear computations and the trusted hardware may execute the non-linear computations in parallel. In some embodiments, the number of linear computations is significantly larger than the number of non-linear computations. One or more recipient devices (e.g., the server, client, HE enabled device, trusted hardware, and/or another third party device) may perform said decrypting and merging the results of the linear and non-linear computations to generate said result of executing the set of computations on the unencrypted data. In some embodiments, the separate results of the linear and non-linear computations may be transmitted in the encrypted domain to the recipient device to be decrypted and then merged in the unencrypted domain. In some embodiments, the HE enabled device may merge the results of the linear and non-linear computations using HE in the encrypted domain and then transmit the merged encrypted results to the recipient device to be decrypted.

In some embodiments, the system may comprise a single client and a single server. In other embodiments, the system may comprise multiple clients that may each provide a different respective set of data and a different public and secret key pair. In some embodiments, the server is a Cloud service comprising the homomorphic encryption (HE) enabled device and the trusted hardware. The server may be trusted or untrusted. In some embodiments, the recipient device is the client device. In some embodiments, the all communication between system devices e.g., the client device, the server, homomorphic encryption (HE) enabled device, the trusted hardware, and/or the recipient device, may occur on one or more authenticated communication channels.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
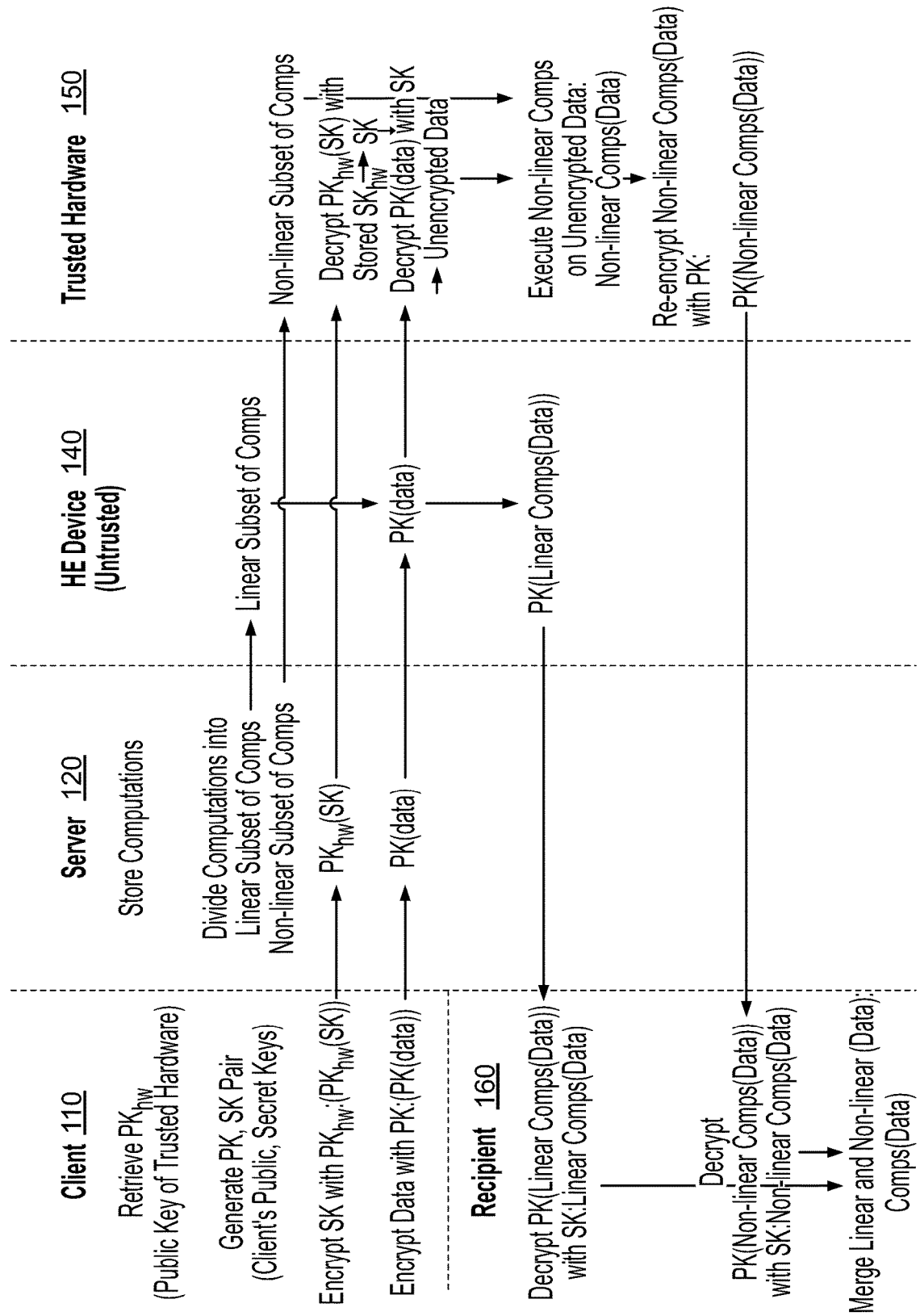
FIG. 1 is a schematic illustration of a workflow of a hybrid approach for fast and efficient secure collaborations in a multi-party system, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In conventional cryptosystems, operations are either performed exclusively in an unencrypted domain at trusted hardware (which has limited memory and computational capacity) or exclusively in an encrypted domain using homomorphic encryption (HE) (which is slow for complex non-linear operations).

Figure 4:
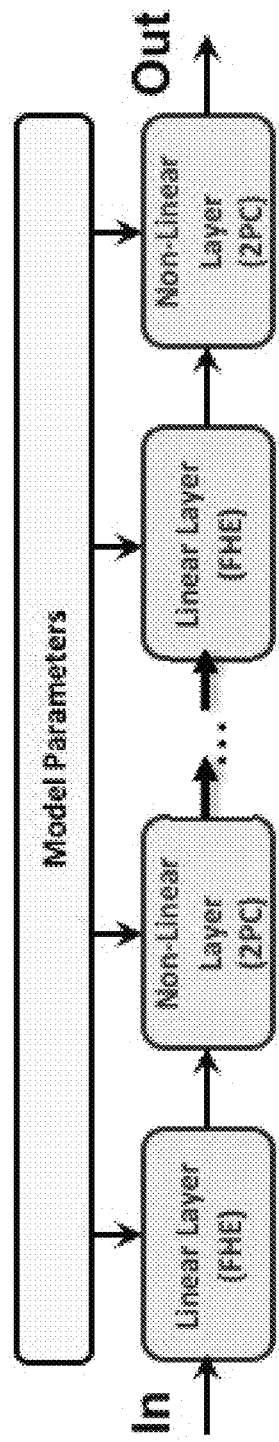
FIG. 4 is a schematic illustration of data structures for performing operations in a hybrid environment of trusted and untrusted devices, according to an embodiment of the invention.

According to embodiments of the invention, a hybrid approach is provided that intelligently splits operations between the trusted hardware (unencrypted domain) and HE device (encrypted domain). In the hybrid approach, a set of original computations are divided into a subset of linear computations and a distinct subset of non-linear computations. Example computations include a neural network divided into linear and non-linear neural or hidden layers as shown in FIG. 4, series expansions, such as, Laurent Series, Maclaurin Series, Power Series, Taylor Series, or other series divided into a linear or first order term and non-linear or higher order series terms, conversions into a frequency domain divided into linear and non-linear bases, etc. The subset of linear computations may be transmitted to a first HE-enabled device, which executes the linear computations on encrypted data by homomorphic encryption (HE) in the encrypted domain. The subset of non-linear computations may be transmitted to trusted hardware (e.g., at the same or different device), which executes the non-linear computations on unencrypted data in an unencrypted domain. The trusted hardware may subsequently encrypt the computation results. Separating the linear and non-linear results prevents both the trusted hardware (in the unencrypted domain) and the HE device (in the encrypted domain) from backwards engineering to reconstruct the original data from the results. Both the encrypted linear and non-linear results may then be transmitted to a secure device (e.g., a client that owns the data). The secure device may decrypt and merge the results of the linear and non-linear computations to generate a result equivalent to executing the complete set of original computations on the unencrypted data.

In this hybrid approach, the benefits of HE are exploited (e.g., allowing fast linear HE operations in the encrypted domain, not at the limited-capacity trusted hardware), while reducing the disadvantages of HE (e.g., avoiding executing non-linear operations using slow HE techniques, by executing them at the trusted hardware). Thus, instead of executing all operations at the trusted hardware as in conventional systems, only a subset (e.g., minority) of exclusively non-linear computations are performed at the trusted hardware, thereby reducing its computational and memory burden, and increasing its performance. Additionally, moving the majority of computations away from trusted hardware, decreases the size or number of secure chips relied upon to perform the same number of computations, making it cheaper and easier to perform updates and maintain security compliance.

Reference is made to FIG. 1, which schematically illustrates a workflow of a hybrid approach to secure collaborations on encrypted data in a multi-party system, according to an embodiment of the invention. The multi-party system may include a client 110, a computation server 120, a HE enabled device 140, a trusted hardware device 150, and a recipient device 160 e.g., described in reference to FIGS. 2 and/or 3.

Client 110 may store secret data D, e.g., in an encrypted or unencrypted form, in memory 118. Client 110 may generate and store a pair of the client's public and secret keys (PK, SK) to respectively encrypt and decrypt the secret data. The client's key pair (PK, SK) may be uniquely associated with the client 110, the data D, and/or particular computations C. Client 110 may obtain and store the trusted hardware device's 150 public key $PK_{hw}$.

Client 110 may encrypt the data with the client's public key PK(D) and may encrypt the client's secret key with a trusted device's public key $PK_{hw}$(SK).

Client 110 may transmit the encrypted data PK(D), directly or indirectly e.g. via server 120 to HE enabled device 140, and may transmit the encrypted data PK(D) and the encrypted secret key $PK_{hw}$(SK), directly or indirectly e.g. via server 120 to trusted hardware device 150.

Server 120 may store the set of computations C and divide those computations into a subset of linear computations $C_L$ and a subset of non-linear computations $C_{NL}$. Server 120 may transmit the subset of linear computations $C_L$ to HE enabled device 140 and the subset of non-linear computations $C_{NL}$ to trusted hardware device 150.

HE enabled device 140 may homomorphically execute the linear computations $C_L$ on the encrypted data PK(D), without decrypting the data, to generate a homomorphically encrypted result of the linear computations PK($C_L$(D)). HE enabled device 140 may then transmit the homomorphically encrypted result of the linear computations PK($C_L$(D)), directly or indirectly e.g. via server 120, to a recipient device 160 (e.g., the client 110 or another trusted recipient such as a third party collaboration manager).

Trusted hardware device 150 may retrieve its secret key $SK_{hw}$ to decrypt $PK_{hw}$(SK) to expose the client device's secret key SK. Trusted hardware device 150 may use client device's secret key SK to decrypt PK(D) to expose the unencrypted data D. Trusted hardware device 150 may then execute non-linear computations $C_{NL}$ on the unencrypted data D to generate an unencrypted result $C_{NL}$(D). Trusted hardware device 150 may subsequently use the client's public key PK to encrypt the result PK($C_{NL}$(D)). Trusted hardware device 150 may transmit the encrypted result of executing the non-linear computations PK($C_{NL}$(D)), directly or indirectly e.g. via server 120, to the recipient device 160.

The recipient device 160 (e.g., client 110) may decrypt PK($C_{NL}$(D)) and PK($C_L$(D)) using its secret key SK and merge the results of the linear and non-linear computations $C_L$(D) and $C_{NA}$(D) to generate a result equivalent to executing the set of linear and non-linear computations on the unencrypted data C(D). The merged results may be equivalent to executing the complete original set of (undivided) linear and non-linear computations on the unencrypted data.

Figure 2:
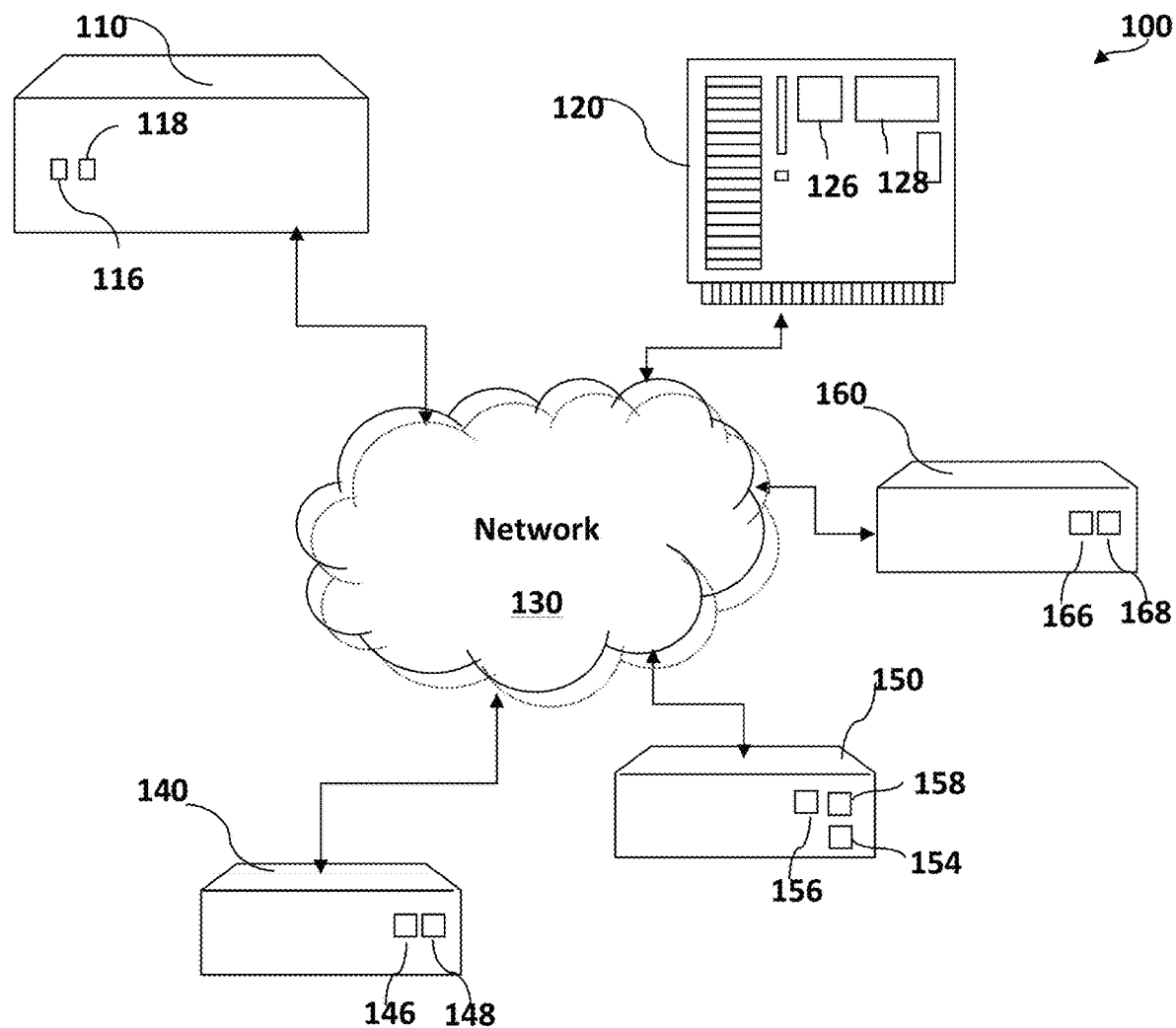
FIG. 2 is a schematic illustration of a multi-party system in a hybrid environment of trusted and untrusted devices, according to an embodiment of the invention.

Reference is made to FIG. 2, which schematically illustrates a multi-party system 100 in a hybrid environment of trusted and untrusted devices, according to an embodiment of the invention.

System 100 may include a client 110, a computation server 120, a HE enabled device 140, a trusted hardware device 150, and a recipient device 160, any combination of which may be disposed as separate devices or integrally combined into the same device. All system 100 devices may be computing devices that may include wired or wireless connections or modems and communicate via a network 130, over one or more authenticated channels. Network 130 may be any public or private network such as the Internet. Access to network 130 may be through wire line, terrestrial wireless, satellite or other systems well known in the art.

Client 110 may securely store one or more sets of unencrypted (or encrypted) data D and one or more pairs of keys (PK, SK).

Computation server(s) 120 may include a computing device for hosting computations, tests or operations C.

HE enabled device 140 may store HE or FHE program code (software) configured to homomorphically execute computations C on encrypted data D.

Trusted hardware device 150 may include one or more trusted hardware units 154 (e.g., secure chips) in compliance with predefined security parameters. Trusted hardware units 154 may securely store one or more pairs of trusted hardware keys ($PK_{hw}$, $SK_{hw}$), one or more client's secret keys SK, the clients' unencrypted data, and the results of non-linear computations performed on the unencrypted data.

Recipient device 160 may have access to the client's secret key SK. Recipient device 160 may be the client 110 itself, computation server 120, trusted hardware device 150, or any trusted recipient granted access to the data D and the client's secret key SK. Example trusted recipients include a third party running collaborative tests, experiments, or analysis, on the data D, or otherwise processing the data D, with the data providers' consent.

Client 110, computation server 120, HE enabled device 140, trusted hardware device 150, and recipient device 160 may include one or more controller(s) or processor(s) 116, 126, 146, 156, and 166, respectively, for executing operations according to embodiments of the invention and one or more memory unit(s) 118, 128, 148, 158, and 168, respectively, for storing data (e.g., encrypted or unencrypted data, encryption and/or decryption keys, and computations) and/or instructions (e.g., software for applying computations or operations, keys to encrypt or decrypt data according to embodiments of the invention) executable by the processor (s). Processor(s) 116, 126, 146, 156, and/or 166 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 128, 148, 158, and/or 168 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Embodiments of the invention provide a system, device and method for implementing a novel hybrid approach to secure collaboration among one or many clients and a computation server. An example instantiation of this scenario is provided by a secure collaboration platform. The secure collaboration platform may operate in a system with many clients (e.g., numbered 1, 2, . . . , n) each storing a respective dataset (e.g., denoted, $D_1, D_2, \ldots, D_n$, respectively). The system may also include a computation server (e.g., denoted S), which operates in an encrypted domain (e.g., only operating on encrypted data, without decrypting or exposing the underlying unencrypted data). The computation server receives as input encrypted datasets from each client, performs computations on the encrypted datasets, and generates corresponding encrypted results.

Embodiments of the invention provide a technique to speed up the computations at the computation server end in the encrypted domain. As an example, computations which have a relatively greater number or complexity of linear components and a relatively smaller number or complexity of non-linear components are discussed, but any other computations may be used. As an example, a system may include two or more clients, the first client having an image to be classified using a neural network, and the second client having the parameters of the neural network with which to perform the classification. Accordingly, to classify the image, both clients should collaborate, without sharing their respective secret data. Classification by a neural network is only an example of computations, and any other computations may be used.

In order to maintain the secrecy of the shared data, embodiments of the invention provide a hybrid approach to secure collaboration, described as follows in a single client setting (FIG. 3) and a multiple client setting. The hybrid approach may divide computations into linear and non-linear components, forwarding the linear subset of computations to be performed at a (e.g., untrusted) homomorphic encryption (HE) device and the non-linear subset of computations to be performed at a trusted hardware device, and then merging the results. This approach is "hybrid" in that it is partially implemented using HE in the encrypted/untrusted domain (for the linear components) and partially implemented without using HE in the unencrypted/trusted domain (for the non-linear components). In some embodiments, all communications between the clients and the computation server may occur on authenticated channels (e.g., through an SSL or TLS connection).

Figure 3:
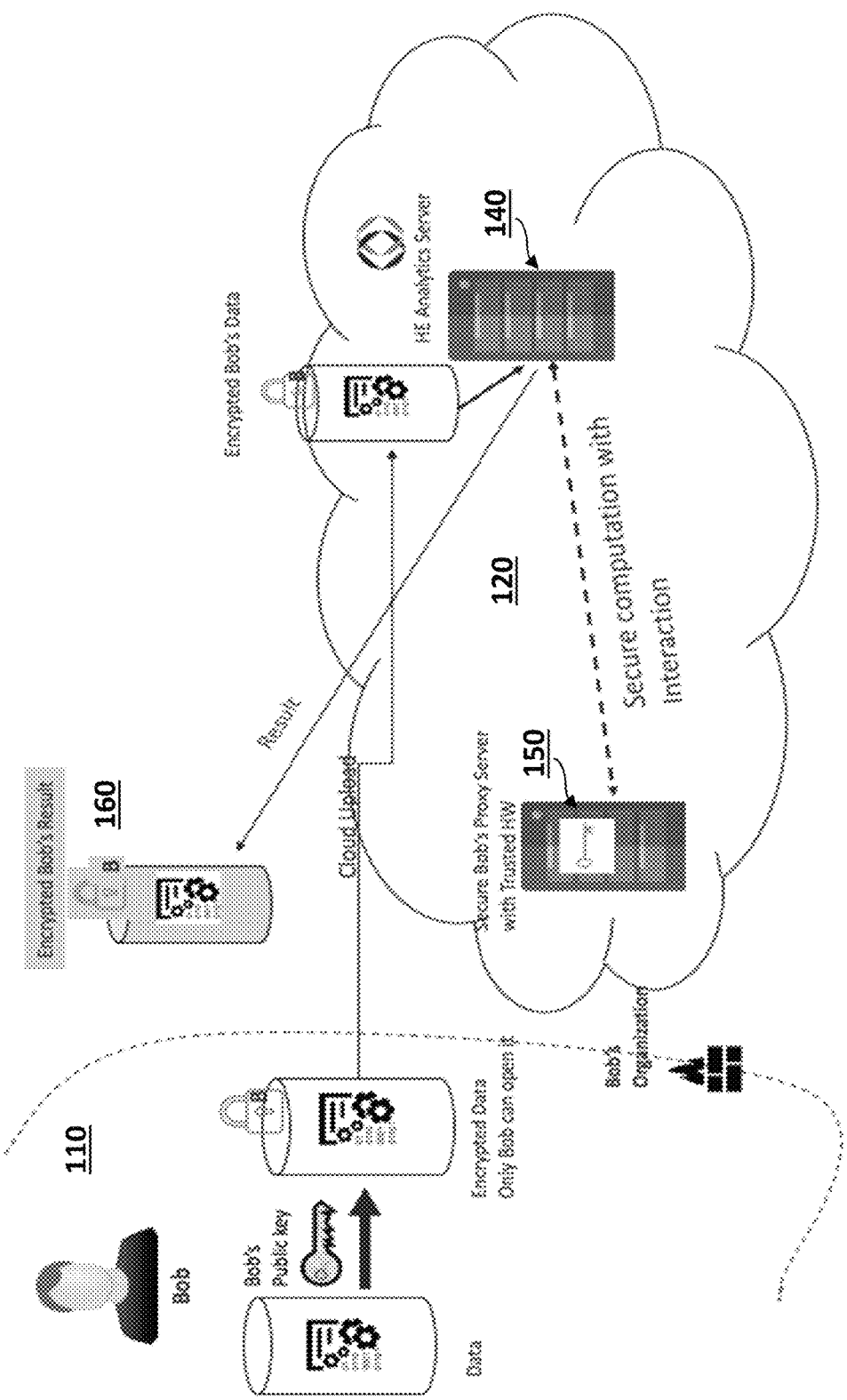
FIG. 3 is a schematic illustration of an example multi-party system with a single client and single computation server, according to an embodiment of the invention.

Reference is made to FIG. 3, which schematically illustrates a multi-party system for a hybrid approach to secure collaboration between a single client and a single computation server, in accordance with some embodiments of the invention. The architecture of FIG. 3 can be applied to any number of clients and any number of servers, e.g., in a single client-single server setting (as shown), a multi client-single server setting, a single client-multi server setting, or a multi client-multi server setting. In the example architecture of FIG. 3, the computation server 120 is implemented as a cloud service containing the homomorphic encryption (HE) enabled device 140 and trusted hardware 150. However, computation server 120 may also be implemented as a separate device from HE enabled device 140 and trusted hardware 150.

The system of FIG. 3 may implement the following workflow:
1. A client 110 (e.g., Bob's computer) performs the following system set up: (a) retrieve a public key associated to a trusted hardware device, denoted $PK_{hw}$; (b) generate a public/secret key pair (PK, SK) for a packed additively homomorphic encryption (PAHE) scheme; (c) encrypt SK using $PK_{hw}$; (d) send this encryption to the computation server 120, to HE analytics server 140; and (e) store PK and SK in a secure local location.
2. The client 110 encrypts their input dataset using PK and sends it to the computation server 120.
3. The computation server 120 receives the encrypted data (from Step 2) and proceeds with each step of the computation. The computation may be divided into linear and non-linear operations or sub-steps, e.g., as illustrated in FIG. 4.
4. At the computation server 120 end, in a separate or integral HE enabled device 140, the computationally heavy (e.g., relatively greater number or complexity of) linear steps are performed using the homomorphic capability of the PAHE scheme, without using trusted hardware.
5. At the computation server 120 end, in a separate or integral trusted hardware device 150, the computationally light (e.g., relatively smaller number or complexity of) non-linear steps are performed as follows: (a) the computation server sends the encrypted intermediate computation state (encrypted under the public key PK) and the encryption of SK (encrypted under the public key $PK_{hw}$) to the trusted hardware; (b) the trusted hardware decrypts the latter using its stored secret key $SK_{hw}$ to retrieve SK; (c) using the secret key SK, the trusted hardware decrypts the encrypted intermediate computation state and performs the light non-linear operations, e.g., in parallel, or at an overlapping time, to the HE device performing the linear operations (step 4); (d) the trusted hardware re-encrypts the result of the non-linear operations using PK; and (e) the trusted hardware sends the encryption result of the non-linear operations to the computation server.
6. The computation server 120 receives the encrypted computational results from the trusted hardware, and sends it back to the client 110 or another trusted recipient device 160. The client or other trusted recipient possesses the secret key SK, decrypts and retrieves the result of the applying the (e.g., neural network) computations to the secret data. The result may be equivalent to what would have been produced if the complete set of computations were executed on the unencrypted data, but according to embodiments of the invention no unencrypted data is exposed to an untrusted party.

Other operations or orders of operations may be used.

This workflow allows the computation server 120 or separate devices 140 and 150 to perform computations without ever accessing the client's secret data, and allows the client or recipient to obtain the results without ever accessing the computations, thus providing collaboration between multiple parties without exposing each other's data.

According to some embodiments, improvements are provided for speeding up the computational time by the fact that (a) the PAHE scheme is very efficient at handling the linear computations on encrypted data, as compared to conventional systems which outsource them to the trusted hardware which incurs a significant bandwidth penalty and time delay; and (b) the trusted hardware may handle the non-linear operations (which may be very complex, or in some cases, impossible) in parallel to the PAHE scheme computations in the encrypted domain.

In some embodiment, the system may be secure, such that, adversarial entities in possession of a proxy host that holds the encrypted data with trusted hardware (see FIG. 3) can not break into the trusted hardware and steal the secret key.

The system of FIG. 3 may be modified to handle multiple clients to perform joint computations on their respective secret data, for example, by replacing Steps 1-6 above with Steps 1'-6' as follows.

1'. Each client 110 $i$ (e.g., Bob's computer) of the multiple clients (e.g., 1, 2, ..., n) performs the following system set up: (a) retrieve the public key associated to a trusted hardware, denoted $PK_{hw}$; (b) generate a public/secret key pair ($PK_i$,$SK_i$) for a threshold PAHE scheme. A threshold encryption scheme enables data to be encrypted by multiple entities, but decrypted only if some nontrivial subset of them agree to decrypt; (c) encrypt $SK_i$ using $PK_{hw}$; (d) send this encryption to the computation server 120; and, (e) store $PK_i$ and $SK_i$ in a secure local location.

2'. The computation server 120 sends these encryptions to the trusted hardware 150. The trusted hardware decrypts these encryptions, retrieves $SK_i$ and stores $SK:=\Sigma SK_i$ locally for each client i. In a threshold PAHE scheme, if $SK_i$'s are secret keys corresponding to $PK_i$, then $SK:=SK_i$ is the secret key corresponding to the public key $PK:=\Sigma PK_i$.

3'. Each client i sends its public key $PK_i$ to the computation server 120.

4'. The computation server 120 computes the joint public key $PK:=\Sigma PK_i$ and sends it back to all n clients.

5'. Each client 110 $i$ then encrypts their input using the joint public key PK and sends it to the computation server 120.

6'. The computation server 120 receives the encrypted data (from Step 5') and proceeds with each step of the computation. The computation may be divided into linear and non-linear operations or sub-steps, e.g., as illustrated in FIG. 4.

7'. At the computation server 120 end, in a separate or integral HE enabled device 140, the heavy linear steps are performed using the homomorphic capability of the PAHE scheme, without using the trusted hardware, e.g., as described above.

8'. At the computation server 120 end, in a separate or integral trusted hardware device 150, the light non-linear steps are performed using the trusted hardware, e.g., as described above.

9'. The computation server 120 receives the encrypted computational result, and sends it back to the n clients 110 or one or more (n) other trusted recipients 160. The client or other trusted recipient i, which possesses secret keys SK, may compute partial decryption results and exchanges them with all other clients or other recipients. This may be performed either directly at the clients or other recipients, or through the computation server by establishing SSL/TLS connections. The clients or other recipients may use the threshold decryption mechanism to combine the partial decryption results to retrieve the cumulative computation result.

Other operations or orders of operations may be used.

Reference is made to FIG. 4, which schematically illustrates data structures for dividing example computations of a neural network into a linear subset and a non-linear subset, according to an embodiment of the invention. In FIG. 4, the architecture of the neural network is decomposed into a plurality of linear and non-linear sub-steps or neural layers. The linear subset and a non-linear subset are distributed to an HE-enabled device (in an encrypted domain) and trusted hardware (in an unencrypted domain), respectively.

In a collaborative system, the neural network may receive data from two (or more) users. A first set of data may be received from a first user/client as input via a first or input layer ("In"). A second set of data may be received from a second user/client as "Model Parameters" defining how the neural network is structured to operate on the input. Additional inputs or parameters from additional respective users/clients may be received or alternatively, all inputs may be received form the same single user. In the example of FIG. 4, the non-linear sub-steps are performed using two-party computations (2PC) (computations evaluated by multiple parties).

In an example neural network, such as a convolutional neural network, a relatively large proportion or majority of computations are linear (e.g., weighted averages, inner products, and permutations), all of which may be executed on the HE-enabled device, while a relatively small proportion or minority of computations are non-linear (e.g., sigmoid operations), all of which may be executed on the trusted hardware.

Although the example in FIG. 4 shows that the computations are executed in an alternating series of linear and non-linear sub-steps, other workflows may be used including multiple parallel paths, multi-in/one-out, one-in/multi-out (MIMO), multi-in/multi-out (MIMO), tree graphs, loops, gradient descent, or any other workflow or division of linear and non-linear computations or sub-steps.

Embodiments of the invention may be described from the perspective of each device or components in the multi-party system:

Computation Server-side perspective: A method for secure collaborations on encrypted data in a hybrid environment of a homomorphic encryption (HE) enabled device and trusted hardware, the method comprising:
  at the computation server:
    dividing a set of computations into a subset of linear computations and a subset of non-linear computations,
    transmitting the subset of linear computations and encrypted data to the homomorphic encryption (HE) enabled device for executing the linear computations on the encrypted data, without decrypting the data, to generate a homomorphically encrypted result of the linear computations;
    transmitting the subset of non-linear computations, the encrypted data, and an encrypted secret key, to the trusted hardware configured to decrypt the secret key to, in turn, decrypt the encrypted data, to execute the non-linear computations on the unencrypted data, and subsequently encrypt the result of executing the non-linear computations; and
    receiving from the homomorphic encryption (HE) enabled device and trusted hardware and forwarding to a recipient device, the encrypted results of the linear and non-linear computations, respectively, in order for the recipient device to decrypt and merge the results of the linear and non-linear computations to generate a result equivalent to executing the complete set of computations on the unencrypted data.

Client-side perspective: A method for secure collaborations on encrypted data in a hybrid environment of a homomorphic encryption (HE) enabled device and trusted hardware, the method comprising:
  at a client device:
    encrypting data with a public key associated with the client device;

encrypting a secret key associated with the client device with a public key associated with the trusted hardware;

transmitting the encrypted data and encrypted secret key to a server;

receiving, from the server, encrypted results of remotely performing at the homomorphic encryption (HE) enabled device linear computations on the encrypted data, without remotely decrypting the data, to generate a homomorphically encrypted result of the linear computations;

receiving, from the server, encrypted results of remotely at the trusted hardware, decrypting the secret key to, in turn, decrypt the encrypted data, and to execute the non-linear computations on the unencrypted data, and subsequently encrypt the result of executing the non-linear computations; and decrypting and merging the results of the linear and non-linear computations to generate a result equivalent to executing the combination of linear and non-linear computations on the unencrypted data.

HE device-side perspective: A method for secure collaborations on encrypted data in a hybrid environment of a homomorphic encryption (HE) enabled device and trusted hardware, the method comprising:

at the homomorphic encryption (HE) enabled device:

receiving linear computations and encrypted data;

performing homomorphic encryption (HE) executing the linear computations on the encrypted data, without decrypting the data, to generate a homomorphically encrypted result of the linear computations; and transmitting, directly or indirectly to a recipient device, the homomorphically encrypted result of the linear computations, wherein the recipient device is configured to receive an encrypted version of a result of executing non-linear computations on corresponding unencrypted data in an unencrypted domain at the trusted hardware, and wherein the recipient device is configured to decrypt and merge the results of the linear and non-linear computations to generate a result equivalent to executing the combination of linear and non-linear computations on the unencrypted data.

Trusted Hardware-side perspective: A method for secure collaborations on encrypted data in a hybrid environment of a homomorphic encryption (HE) enabled device and trusted hardware, the method comprising:

at the trusted hardware:

receiving non-linear computations, data encrypted by a client device's public key, and the client device's secret key encrypted by the trusted device's public key;

decrypting the client device's secret key using the trusted device's secret key;

decrypting the encrypted data using the client device's secret key;

executing non-linear computations on the unencrypted data in an unencrypted domain;

encrypting the result of executing the non-linear computations; and transmitting, directly or indirectly to a recipient device, the encrypted result of executing the non-linear computations, wherein the recipient device also receives an encrypted result of homomorphically executing linear computations on the encrypted data in an encrypted domain, and wherein the recipient device is configured to decrypt and merge the results of the linear and non-linear computations to generate a result equivalent to executing the combination of linear and non-linear computations on the unencrypted data.

It may be appreciated that any system device including the client, computation server, HE enabled device, trusted hardware, and/or recipient devices may be disposed in the same or different devices, may be mutually exclusive, inclusive, integrated, operably or physically connected, separate in operation or location, part of the same or different one or more Clouds, or configured according to any architecture.

Embodiments of the invention, though described in reference to example computations involving neural networks, apply to any computations that may be decomposed into linear and non-linear components or steps. Applications of these computations include, but are not limited to, machine learning models, noise rescaling, bootstrapping homomorphic encryption, and in general, any algorithm that can be partitioned into linear and non-linear components. In various embodiments, both the data and computations may be secret, only the data is secret (and the computations are not secret), or only the computations are secret (and the data is not secret). For example, some embodiments of the invention apply to settings where the data is unencrypted and the computations or model is encrypted. The client may possess all or only a subset of the secret unencrypted data and/or computations. Additionally or alternatively, the computational server may possess none of the unencrypted secret data and/or computations or the remaining subset of the unencrypted secret data and/or computations for collaboration with the client's subset (obtained in encrypted form).

As used herein, "trusted" may refer to verified, authenticated or otherwise in compliance with predefined security parameters, and "untrusted" may refer to unverified, unauthenticated, or otherwise not in compliance with predefined security parameters (not necessarily, but may be, malicious). In some embodiments, a party that is not verified to be trusted is untrusted; in other embodiments, untested parties may belong to a third "undetermined" category.

As used herein, "trusted hardware" may refer to special dedicated hardware, distinct from a main memory, that meets predefined security protocol(s), designated to keep it safe from tampering. Typically, secure hardware is hardware which can not be tampered with or reverse engineered. In some embodiments, if trusted hardware is attempted to be tampered with in an unauthorized manner (e.g., violating predefined security protocols), the hardware will self-destruct, shut down, or otherwise terminate its operation temporarily or permanently. Security measures include, for example, tamper detection, tamper-evident containment, conductive shield layers in the chip that prevent reading of internal signals, controlled execution to prevent timing delays from revealing any secret information, automatic zeroization of secrets in the event of tampering, chain of trust boot-loader which authenticates the operating system before loading it, chain of trust operating system which authenticates application software before loading it, hardware-based capability registers, implementing a one-way privilege separation model. Trusted hardware is often implemented as one or more "secure chips". Examples of trusted hardware include "secure cryptoprocessors" or "secure chips".

In the foregoing description, various aspects of the present invention are described. For purposes of explanation, specific configurations and details are set forth in order to provide a thorough understanding of the present invention. However, it will also be apparent to one of ordinary skill in the art that the present invention may be practiced without the specific details presented herein. Furthermore, well known features may be omitted or simplified in order not to obscure the present invention.

Unless specifically stated otherwise, as apparent from the foregoing discussion, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

It should be recognized that embodiments of the present invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for secure collaborations on encrypted data in a hybrid environment of a homomorphic encryption (HE) enabled device and trusted hardware, the method comprising:

dividing, at one or more computational servers, a set of computations into a subset of linear computations and a subset of non-linear computations;

executing, at the homomorphic encryption (HE) enabled device, the linear computations on the encrypted data using homomorphic encryption (HE) to generate an encrypted result of the linear computations;

executing, at the trusted hardware, the non-linear computations on the an unencrypted form of the encrypted data in an unencrypted domain;

encrypting, at the trusted hardware, a result of the non-linear computations to generate an encrypted result of the non-linear computations; and at a recipient device, decrypting the encrypted results of the linear and non-linear computations to generate unencrypted results and merging the unencrypted results to produce an output, or merging at the homomorphic encryption (HE) enabled device or the recipient device the encrypted results of the linear and non-linear computations and decrypting the merged encrypted results at the recipient device to produce the output, wherein the output is equivalent to a result of executing the set of linear and non-linear computations on the unencrypted form of the encrypted data.

2. The method of claim 1, comprising:
at a client, transmitting to the one or more computational servers, data encrypted with the client's public key and the client's secret key encrypted with a trusted device's public key;
at the one or more computational servers transmitting to the homomorphic encryption (HE) enabled device the subset of linear computations and the encrypted data; and transmitting to the trusted hardware the subset of non-linear computations, the encrypted data, and the encrypted secret key;
at the homomorphic encryption (HE) enabled device, transmitting the result of executing the linear computations, directly or indirectly, to the recipient device;
at the trusted hardware, decrypting the client device's secret key to consequently decrypt the encrypted data for said executing the non-linear computations on the unencrypted form of the encrypted data and encrypting the result; and transmitting the encrypted result of executing the non-linear computations, directly or indirectly, to the recipient device.

3. The method of claim 1, wherein the HE enabled device executes the linear computations and the trusted hardware executes the non-linear computations in parallel.

4. The method of claim 1, wherein the number of linear computations is significantly larger than the number of non-linear computations.

5. The method of claim 1, comprising transmitting the separate results of the linear and non-linear computations in the encrypted domain to the recipient device to be decrypted and then merged in the unencrypted domain.

6. The method of claim 1, comprising merging the results of the linear and non-linear computations in the encrypted domain by the HE enabled device and then transmitting the merged encrypted results to a recipient device to be decrypted.

7. The method of claim 2, comprising multiple clients each providing a different respective set of data, and having a different public and secret key pair.

8. The method of claim 2, wherein the server is a trusted or untrusted Cloud service comprising the homomorphic encryption (HE) enabled device and the trusted hardware.

9. The method of claim 2, wherein the recipient device is the client device.

10. The method of claim 1, wherein all communication between the client device, the server, homomorphic encryption (HE) enabled device, the trusted hardware, and the recipient device, occur on one or more authenticated communication channels.

11. A system for secure collaborations on encrypted data in a hybrid environment of a homomorphic encryption (HE) enabled device and trusted hardware, the system comprising:
one or more computational servers comprising one or more processors configured to divide a set of computations into a subset of linear computations and a subset of non-linear computations,
the homomorphic encryption (HE) enabled device configured to execute the linear computations on the encrypted data using homomorphic encryption (HE) in an encrypted domain to generate an encrypted result of the linear computations,
the trusted hardware configured to execute the non-linear computations on an unencrypted form of the encrypted data in an unencrypted domain and encrypt a result of the non-linear computations to generate an encrypted result of the non-linear computations, and
a recipient device configured to decrypt the encrypted results of the linear and non-linear computations to generate unencrypted results and merge the unencrypted results to produce an output, or the homomorphic encryption (HE) enabled device or the recipient device configured to merge the encrypted results of the linear and non-linear computations and the recipient device configured to decrypt the merged encrypted results to produce the output, wherein the output is equivalent to a result of executing the set of linear and non-linear computations on the unencrypted form of the encrypted data.

12. The system of claim 11, wherein the one or more computation servers are configured to:
transmit the subset of linear computations with the encrypted data to the homomorphic encryption (HE) enabled device for executing the linear computations on the encrypted data, and
transmit the subset of non-linear computations with the encrypted data and an encrypted secret key to the trusted hardware configured to decrypt the secret key and to, in turn, decrypt the encrypted data, to execute the non-linear computations on an unencrypted form of the encrypted data.

13. The system of claim 11, wherein the HE enabled device executes the linear computations and the trusted hardware executes the non-linear computations in parallel.

14. The system of claim 11, wherein the number of linear computations is significantly larger than the number of non-linear computations.

15. The system of claim 11, wherein the separate results of the linear and non-linear computations in the encrypted domain are transmitted to the recipient device to be decrypted and then merged in the unencrypted domain.

16. The system of claim 11, wherein the results of the linear and non-linear computations are merging in the encrypted domain by the HE enabled device and then the merged encrypted results are transmitted to the recipient device to be decrypted.

17. The system of claim 11, wherein the one or more computation servers are in communication with multiple clients each providing a different respective set of data, and having a different public and secret key pair.

18. The system of claim 11, wherein the one or more computation servers are trusted or untrusted devices in a Cloud service comprising the homomorphic encryption (HE) enabled device and the trusted hardware.

19. The system of claim 11, wherein the recipient device is a client device.

20. The system of claim 11, wherein the one or more computation servers are configured to perform all communication with other system devices on one or more authenticated communication channels.

* * * * *